United States Patent [19]

Warren

[11] 4,012,967
[45] Mar. 22, 1977

[54] ADJUSTABLE DRIVE ROD SYSTEM
[76] Inventor: William H. Warren, 729 S. Main St., Centerville, Mass. 02632
[22] Filed: Aug. 22, 1974
[21] Appl. No.: 499,535
[52] U.S. Cl. .................................. 74/586; 403/43
[51] Int. Cl.$^2$ ......................................... G05J 1/00
[58] Field of Search .............. 74/582, 586; 403/43, 403/44, 45, 46, 47, 48

[56] References Cited
UNITED STATES PATENTS

| | | | |
|---|---|---|---|
| 778,889 | 1/1905 | Plowder | 403/44 |
| 1,473,677 | 11/1923 | Hoffmann | 403/44 |
| 2,444,666 | 7/1948 | Orain | 403/43 |
| 3,051,519 | 8/1962 | Sudeikis | 403/43 |

Primary Examiner—Samuel Scott
Assistant Examiner—Wesley S. Ratliff, Jr.
Attorney, Agent, or Firm—Holland, Armstrong, Wilkie & Previto

[57] ABSTRACT

An improved drive system is described for use in coupling a drive means to a driven element. The system includes a novel drive rod with threadedly connected portions which permit an adjustment of the drive rod length with an independent adjustment of a spring loaded coupling for permitting the rod to shorten when the driven member encounters an obstruction which exerts more than a predetermined obstructive force on the drive system. The drive rod is useful, for example, in operating an article transfer machine such as one having an oscillating egg transfer head. The drive rod length adjustment adjusts the end positions of the path of motion of the transfer head. The adjustable spring loaded coupling in the drive rod permits a temporary interruption in the movement of the driven head preventing injury to the operator or damage to the machine where an operator's hand or some other object inadvertently enters the path of the transfer head. Additionally, the spring loaded coupling facilitates egg transfer by permitting the transfer head to engage oversized eggs without excess pressure and accommodates the pick-up action for use at stacks of trays of steadily increasing height.

1 Claim, 4 Drawing Figures

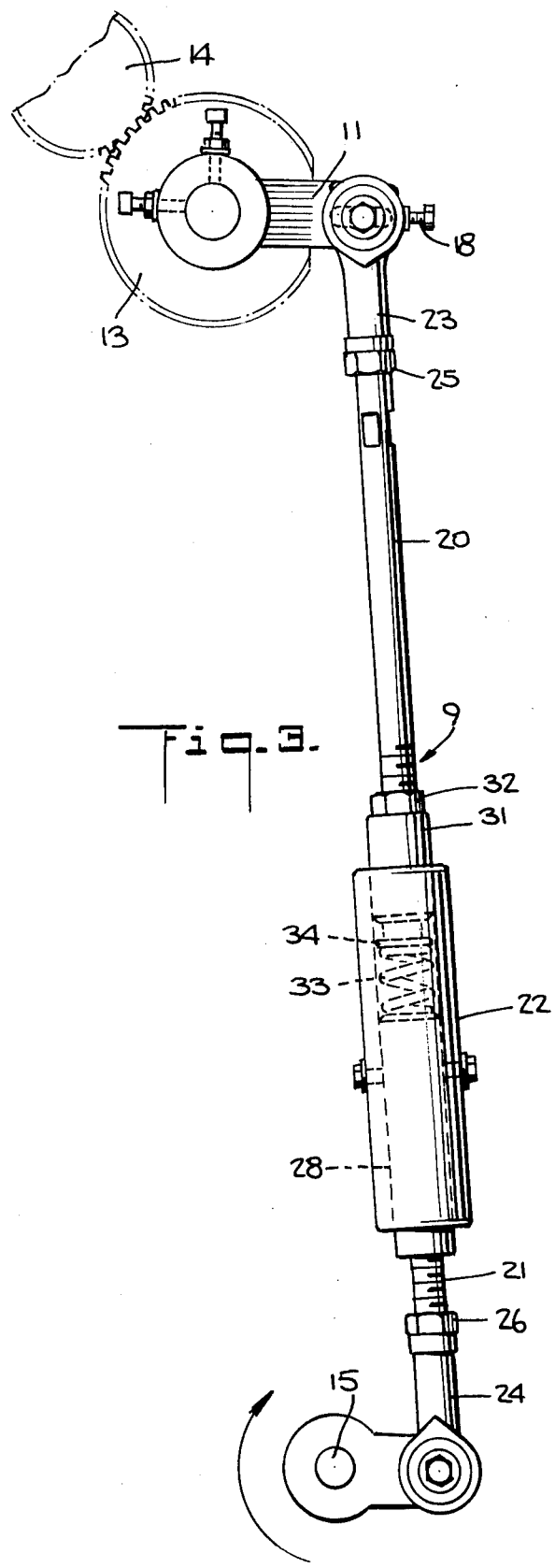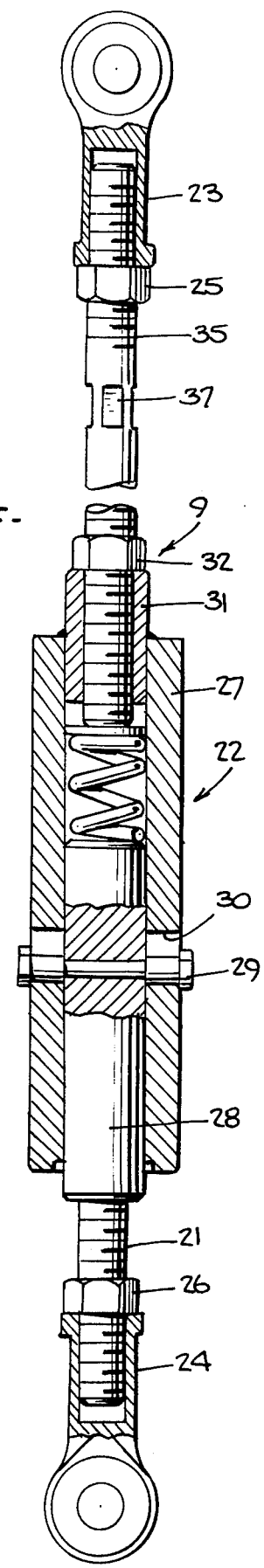

ADJUSTABLE DRIVE ROD SYSTEM

BACKGROUND OF THE INVENTION

The present invention relates to improvements in mechanical drive means such as drive means for article transfer or similar machinery. More particularly, the invention relates to an improved drive system including a drive rod in the drive train for a driven member which combines an adjustment means for the rod length with an independent spring loaded adjustment means for shortening the rod and thus limiting the rod drive force responsive to an interruption in the movement of the driven member.

The improved drive rod, for example, will be described in a typical use in the drive system of an egg transfer machine where an adjustment of the path of the egg transfer head and protection against excess transfer head pressures are desirable characteristics for the egg transfer system drive. One such system is shown in my co-pending United States patent application Ser. No. 445,577 entitled IMPROVED METHOD AND MEANS FOR TRANSFERRING EGGS, filed on Feb. 25, 1974. Such a transfer head picks up a number of eggs at a pick-up point and carries them along a predetermined path to an egg placing position at an egg conveyor. The egg transfer head is mounted on a pair of pivotally supported arms with the arms being rocked by a drive shaft coupled through a drive system to a drive motor. The improved drive rod of this invention is incorporated in the drive system so that adjustments of the rod length permit changes in the end positions of the path of the egg transfer head. At the same time, an independent adjustment of the resilient rod coupling permits the rod to shorten when the transfer head encounters an obstruction while moving in one direction, such as the pick-up direction. This capability permits the pick-up head to encounter the operator's hands or another foreign object and to terminate the pick-up head motion without damage to the object or to the machine. It also permits the pick-up head to engage gently and to pick-up eggs of differing sizes or at differing positions as, for example, where the eggs are being removed from the top tray of a stack of trays of increasing height.

Accordingly, an object of the present invention is to provide an improved mechanical drive system for transfer machines or other devices.

Another object of the present invention is to provide an improved drive rod of adjustable length and having an independently adjustable drive force limiting means.

Another object of the present invention is to provide an improved drive system for an egg transfer device.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein:

FIG. 3 is a side elevational view of a preferred embodiment of the drive rod of FIG. 2 with portions cut away; and FIG. 4 is a vertical sectional view of the drive rod of FIG. 3.

DESCRIPTION OF THE PREFERRED EMBODIMENT

Figure 1:
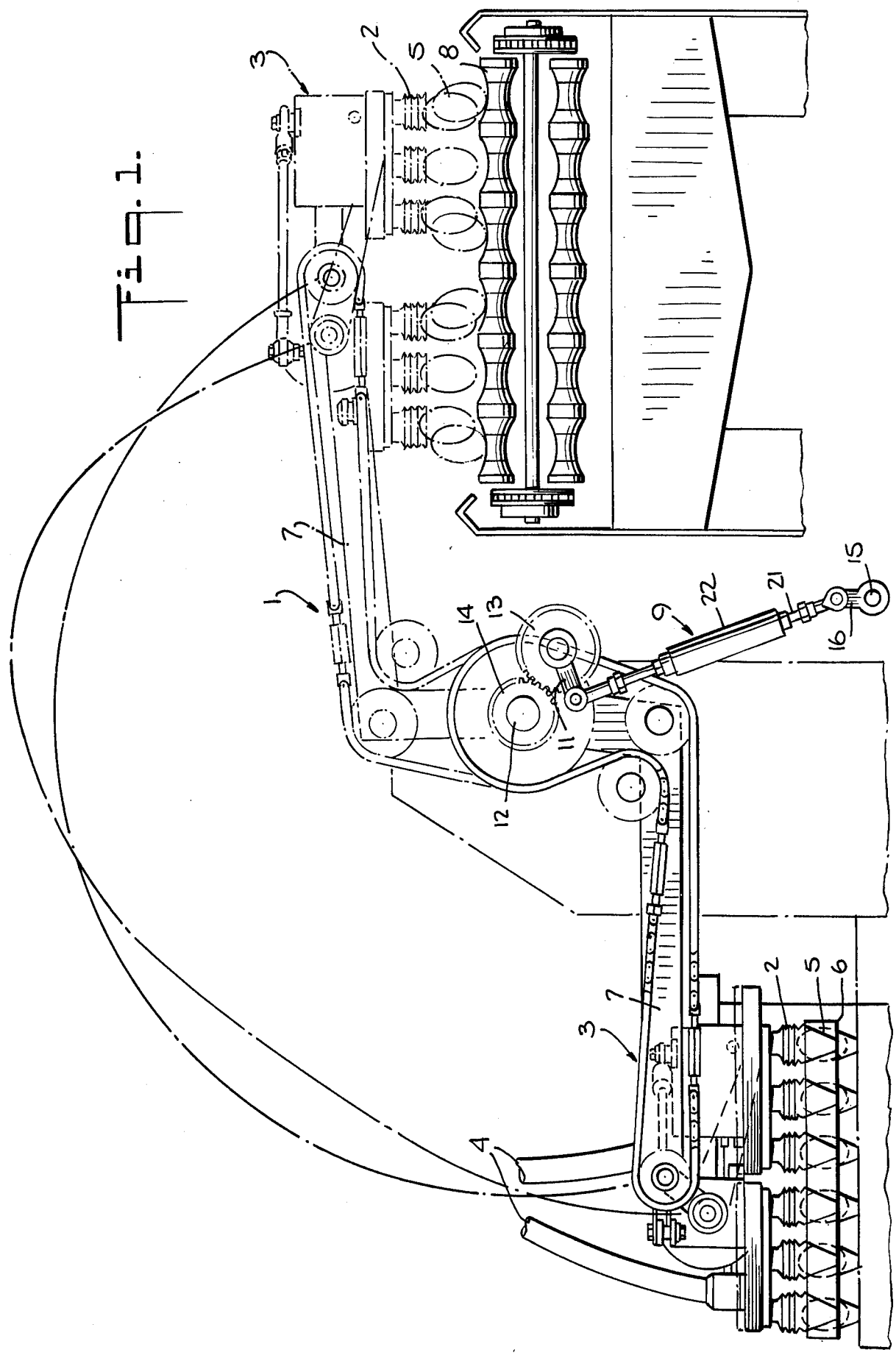
FIG. 1 is a side elevational view illustrating the drive rod of the present invention in a typical installation providing an oscillating motion for the pick-up head of an egg transfer machine.

A drive system in accordance with the present invention will now be described in a use which illustrates the advantages of the improved rod. This use is in an egg transfer device for moving a number of eggs from an egg pick-up position to an egg placing position. Such a device 1 is illustrated in FIG. 1 where a number of rubber vacuum cups 2 are mounted on a pick-up head 3 and are coupled by lines 4 to a source of vacuum to engage eggs 5 at a pick-up position at an egg tray 6. Pivotally mounted arms 7 swing the head 3 from the left hand pick-up position at the tray 6 to a right hand egg placement position on a conveyor 8. The arms 7 are driven by a drive system including a drive rod 9 made in accordance with the present invention. The drive rod 9 operatively couples the pivoted arms 7 to a drive crank 16. A change in the length of the drive rod 9 is seen to change the egg pick-up position and the egg placing position.

The eggs 5 which are picked up at the left hand pick-up position are fed to the pick-up position on egg trays 6. It is preferable in the egg handling system in many instances for the empty trays 6 to remain at the pick-up position in a stack of increasing height until an appreciable number of trays 6 are included in the stack. This preferred method of operation requires the pick-up head 3 to engage eggs of differing sizes, i.e. heights, and at a steadily rising stack level. It is also desirable that the head 3 movement be terminated should an operator's hand or another object accidently be positioned in the path of the pick-up head 3. The drive rod 9 in accordance with the invention provides this feature by means of its resilient and adjustable construction in a manner which will be more fully described.

Figure 2:
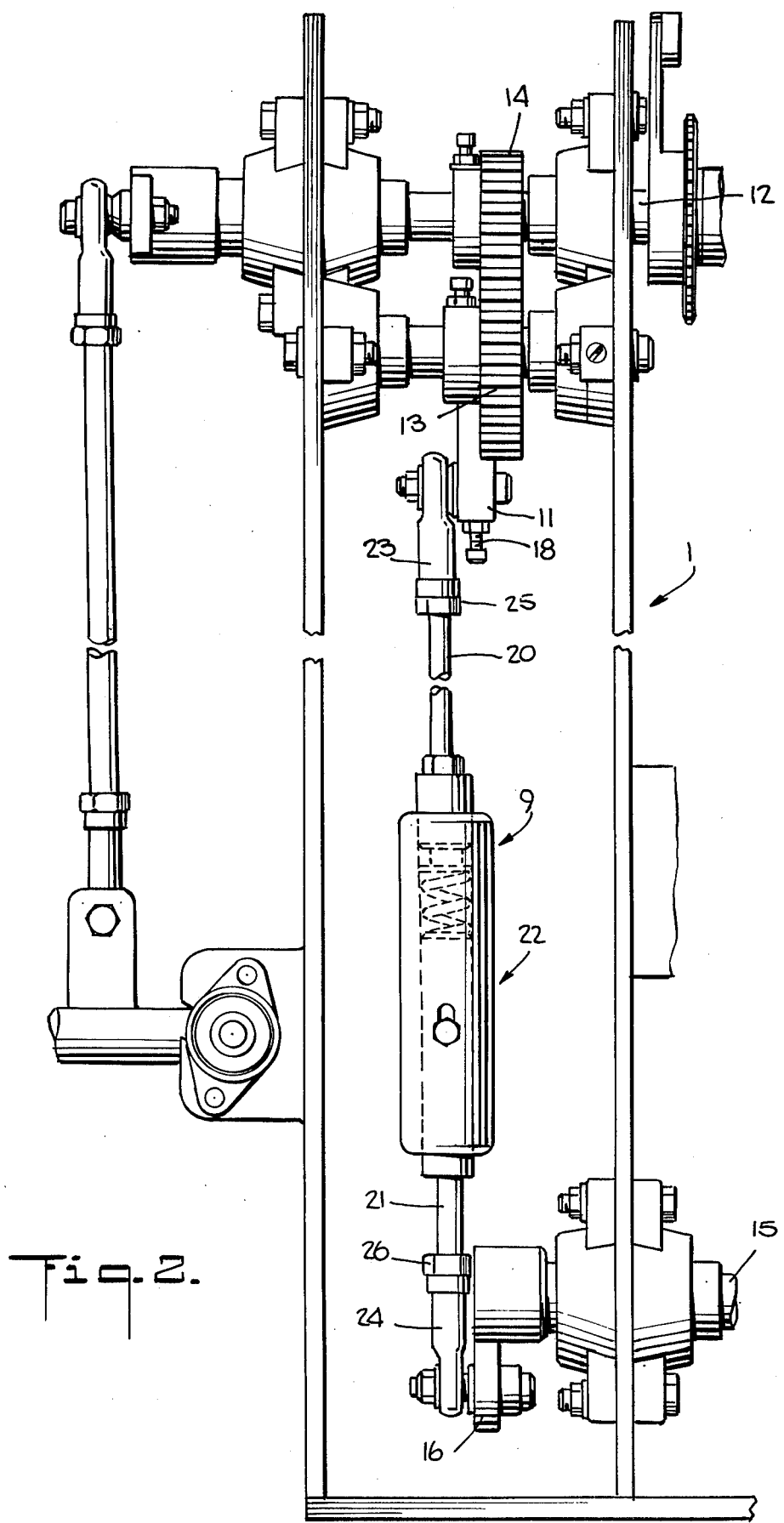
FIG. 2 is a front elevational view of a typical drive system such as for the machine of FIG. 1 including a coupling drive rod in accordance with the invention.

FIG. 2 illustrates a drive system including a crank 11 which oscillates the upper drive shaft 12 by means of pinions 13 and 14 and a lower continuously rotating drive shaft 15 coupled to the drive rod 9 by a crank 16. The lower drive shaft 15 is continuously rotated during the transfer operation by an electric drive motor or other drive motor causing the crank 16 to rotate. The drive rod 9 couples the crank 16 to the crank 11 attached to the pinions 13 and 14. The drive rod 9 and crank 11, 16 arrangement coverts the rotary motion of the drive shaft 15 to an oscillating motion of the pinions 13 and 14. This oscillating or rocking motion of the pinions 13 and 14 is used in the manner illustrated in FIG. 2 to turn the upper arm mounting shaft 12 providing the desired arc of rocking motion for the shaft 12 and the interconnected support arms 7.

An adjustable threaded coupling 18 is provided between the crank 11 and the rod 9. By changing the effective crank length, this changes the arc traveled by the pivoted arm 7 and the attached pick-up head 3.

THE DRIVE ROD

A preferred embodiment of the drive rod 9 will now be described in detail and particularly with reference to FIGS. 2 through 4. The rod 9 comprises first and second end rods 20 and 21 which are connected by a resilient or spring loaded coupling 22. The end rods 20 and 21 are threadedly attached to end bearings 23 and 24. Lock nuts 25 and 26 are provided at the bearings 23 and 24 to fix the relative axial positions of the bearings 23 and 24 and the end rods 20 and 21. The resilient coupling 22 includes an outer sleeve 27 which slidably contains a cylindrical bearing 28 connected to the end rod 21. The bearing 28 slides axially of the outer sleeve 27 within the limits set by a pin 29 slidably positioned within elongated slots 30 in the outer sleeve 27. The opposite end rod 20 is threadedly connected by a threaded bushing 31 to the sleeve 27 with its position being retained by a lock nut 32. A compressed resilient member, such as the coil spring 33, is positioned between a washer 34 at the inner end of the end rod 20 and inner end 38 of the slidable bearing 28. The compressed spring 33 normally maintains the rod 9 in its fully extended position by forcing the end rod 21 outwardly so that the pin 29 is held against the outer end of the slots 30. The force which holds the rod 9 in its extended position and thus the force which will cause the rod to shorten when necessary is adjustably controlled by the end rod 20. The position of the rod 20 in the threaded bushing 31 is changed to adjust the spring compression as desired to reach the desired rod force. In order to permit this adjustment to be made without changing the overall length of the rod 9, i.e. the distance between the centers of the two bearings 23 and 24, the threads 35 and 36 on the opposite ends of the end rod 20 are similar threads so that turning the rod 20 into bushing 31 turns the rod 20 an equal distance out of bearing 23.

The length of the rod 9 is adjustable independently of the above described tension adjustment by a simultaneous rotation of both end rods in one direction or the other when the two lock nuts 25 and 26 have been released. The bearing 24 and end rod 21 are threaded to move bearing 24 away from bearing 23 when the locked end rods 20 and 21 are turned in one direction and together when the locked end rods 20 and 21 are turned in the opposite direction. Suitable flats 37 are provided for the adjusting tools.

The dimensions of the upper crank 11 and the relative sizes of the pinions 13 and 14 together with the effective lengths of the arms 7 provide for a multiplication of the distance moved by pick-up head 3 with respect to the related movement of bearing 28 in rod 9. In a typical multiplication, for example, a fraction of an inch movement at the bearing 28 corresponds to a movement of several inches at the pick-up head 3. For the same reason, as soon as the pick-up head 3 encounters any resistance force greater than the force set for a contraction of the rod 9, the necessary interruption in pick-up head movement will occur accompanied by only a small compression of the coil spring 33. The movement of the pick-up position for the pick-up head 3 between a first position for only one tray and a position several inches higher at the top of a stack of trays requires only a small compression of the spring 33 of a fraction of an inch or so.

The change of rod length during machine operation to obtain the above discussed improved results is only required on the downward movement of the pick-up head. The construction of the rod permits no lengthening of the rod during the portion of its drive cycle while it is under tension as it moves from the pick-up position to the placing position.

It will be seen that an improved drive system has been provided including a novel adjustable drive rod. The adjustment provided by the rod permits the changing of the end positions of the driven member as well as interruptions in movement of the driven member resulting from varying pick-up positions or from the presence of a foreign object in the path of the pick-up head. The drive system and the rod provide these features with a design which is reliable and relatively simple. It is particularly useful in transfer systems for fragile articles including eggs. In such uses, it also provides a sanitary adjustable drive system since it requires no portion of the adjusting features to be placed at the egg pick-up head. The remote location of the adjusting elements within the drive system facilitates the sanitizing of the egg engaging portions of the machine.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:
1. In an egg transfer machine for transferring eggs from egg trays to a conveyor:
   means for supporting one or more egg trays on an egg transfer table;
   an egg transfer head movably mounted on said machine and including means for simultaneously engaging eggs in the uppermost tray;
   a driving means;
   a drive rod operatively coupling said driving means and said transfer head; and
   adjusting means on said drive rod for limiting the maximum force exerted by said transfer head while said drive rod is moving said head toward said trays and being inoperative while said drive rod is moving said head toward said conveyor comprising means for movably connecting two spaced portions of said rod including a resilient member urging said portions apart and thread means for adjusting the spring force without changing the rod length; and second thread means for adjusting the rod length without changing the spring force.

* * * * *